(12) United States Patent
Adam et al.

(10) Patent No.: US 10,749,597 B2
(45) Date of Patent: Aug. 18, 2020

(54) WIRELESS INSPECTION SOLUTION

(71) Applicant: AFL TELECOMMUNICATIONS LLC, Duncan, SC (US)

(72) Inventors: Sean Patrick Adam, Wrentham, MA (US); Joseph Fitzgerald, Concord, NH (US)

(73) Assignee: AFL Telecommunications LLC, Duncan, SC (US)

( * ) Notice: Subject to any disclaimer, the term of this patent is extended or adjusted under 35 U.S.C. 154(b) by 410 days.

(21) Appl. No.: 15/036,563

(22) PCT Filed: Nov. 14, 2014

(86) PCT No.: PCT/US2014/065740
§ 371 (c)(1),
(2) Date: May 13, 2016

(87) PCT Pub. No.: WO2015/073850
PCT Pub. Date: May 21, 2015

(65) Prior Publication Data
US 2016/0269106 A1    Sep. 15, 2016

Related U.S. Application Data

(60) Provisional application No. 61/904,636, filed on Nov. 15, 2013.

(51) Int. Cl.
*H04B 10/07* (2013.01)
*G02B 23/24* (2006.01)
(Continued)

(52) U.S. Cl.
CPC ............. *H04B 10/07* (2013.01); *G02B 23/24* (2013.01); *G06T 7/0004* (2013.01); *H04L 65/4069* (2013.01); *H04W 84/12* (2013.01); *G06T 2207/10016* (2013.01); *G06T 2207/30172* (2013.01)

(58) Field of Classification Search
CPC ...... H04B 10/07; G02B 23/24; G06T 7/0004; G06T 2207/10016; G06T 2207/30172; H04L 65/4069; H04W 84/12
See application file for complete search history.

(56) References Cited

U.S. PATENT DOCUMENTS

| 7,884,933 B1 * | 2/2011 | Kashyap | G01N 21/474 356/338 |
| 2007/0167681 A1 * | 7/2007 | Gill | A61B 1/00059 600/112 |

(Continued)

OTHER PUBLICATIONS

Adam, Sean Patrick; International Patent Application No. PCT/US2014/065740; International Search Report; dated Feb. 25, 2015; (2 pages).

*Primary Examiner* — Jefferey F Harold
*Assistant Examiner* — Humam M Satti
(74) *Attorney, Agent, or Firm* — Dority & Manning, P.A.

(57) ABSTRACT

A method of conducting wireless fiber inspection includes obtaining a video stream from an inspection probe and transmitting the video stream over a Wi-Fi network. The method further includes creating the Wi-Fi network using a Wi-Fi hotspot, performing image analysis on the obtained video stream, and transmitting the image analysis along with the video stream over the Wi-Fi network.

15 Claims, 4 Drawing Sheets

(51) Int. Cl.
*G06T 7/00* (2017.01)
*H04L 29/06* (2006.01)
*H04W 84/12* (2009.01)

(56) References Cited

U.S. PATENT DOCUMENTS

| | | |
|---|---|---|
| 2008/0152149 A1 | 6/2008 | Bauchot et al. |
| 2008/0158348 A1 | 7/2008 | Karpen et al. |
| 2011/0085159 A1* | 4/2011 | Levin ............... G01M 11/30 356/73.1 |
| 2011/0258436 A1 | 10/2011 | Watson et al. |
| 2014/0196079 A1* | 7/2014 | Jannard ............. H04L 9/0825 725/31 |
| 2014/0327756 A1* | 11/2014 | Huang ................ G02B 21/06 348/79 |

* cited by examiner

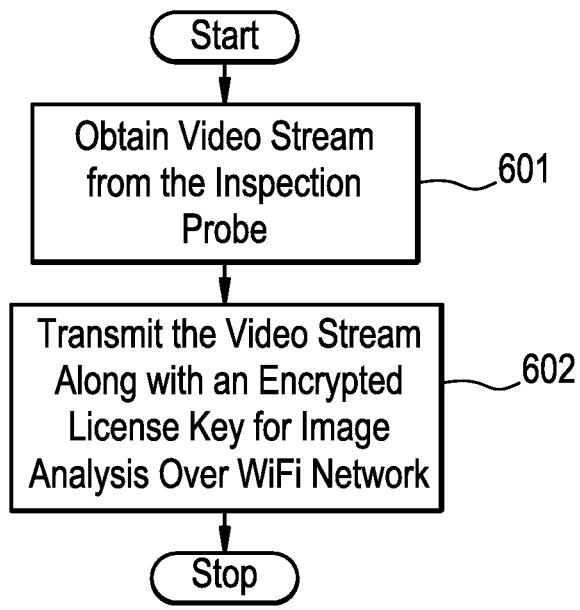
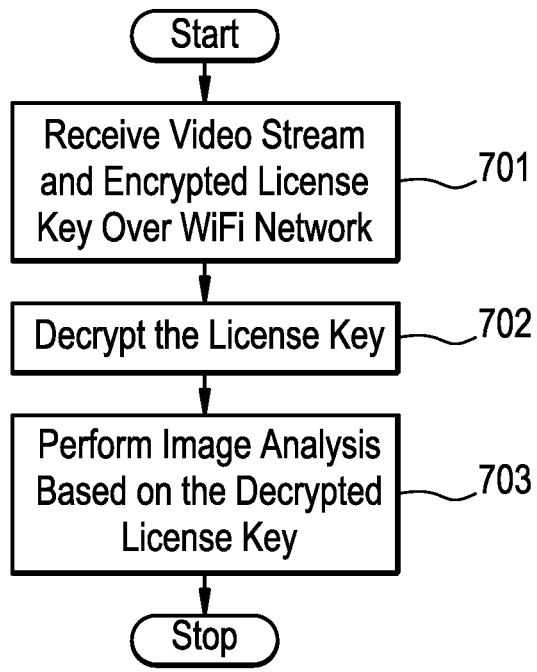

WIRELESS INSPECTION SOLUTION

CROSS-REFERENCE TO RELATED APPLICATIONS

This application is based upon and claims the benefit of priority from U.S. Provisional Application No. 61/904,636, filed Nov. 15, 2013 in the United States Patent and Trademark Office, and as a U.S. national stage filing of International Application No. PCT/US2014/065740 having an international filing date of Nov. 14, 2014, the disclosures of both of which are incorporated by reference herein in their entireties.

BACKGROUND

1. Field

The invention is related to a method and apparatus for wireless fiber inspection, and more particularly to a methods and apparatus for a low investment solution for wireless fiber inspection.

2. Related Art

Fiber Inspection is a key element in fiber installation, maintenance, and certification of fiber networks. Companies responsible for these roles must outfit their field teams and staff with a myriad of equipment from test equipment, to inspection solutions, to cellphones, to hand tools. Such a wireless fiber inspection setup requires a large investment to outfit appropriately and often companies are forced to limit their capabilities to stay within budget.

Inspection is an area where companies struggle to balance the investment. Existing inspection solutions require the purchase of a Inspection Probe and often a corresponding piece of test equipment (for example Optical Time Domain Reflectometers (OTDR)) or a handheld display to display the streaming video from the Inspection Probe.

Inspection Probes are wired-devices—either analog or digital for communication and power—and therefore require a display unit which can support the wired interface.

This limits the availability of solutions for a company and forces them to invest in a specialized display solution.

A majority of Companies outfit their field technicians and staff with Smart Phones, Tablets, or laptops to enable communication, reporting, data analysis, etc. Except for laptops, customers can not leverage their existing investment to enable fiber inspection. Even with laptops, they can only support digital-based Inspection Probes.

Android and IOS based phones and tablets do not support an efficient means to hard-wire connect existing Inspection Probe Solutions. However, a majority of Smart Phones, Tablets, and Laptops support the ability to connect to a WiFi Network.

There is a need to provide a means to interface a digital or analog based Inspection Probe to a Smart Phone, Tablet, or Laptop through a direct WiFi connection.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

According to an aspect of an exemplary embodiment, a method, performed by an apparatus including at least one processor, of conducting wireless fiber inspection, the method includes obtaining a video stream from an inspection probe; and transmitting the video stream over a Wi-Fi network.

According to another exemplary embodiment, the transmitting the video stream further comprises creating the Wi-Fi network using a Wi-Fi hotspot and transmitting the video stream over a Wi-Fi network.

According to another exemplary embodiment, the method further includes performing image analysis on the obtained video stream, and transmitting the image analysis along with the video stream over the Wi-Fi network.

According to another exemplary embodiment, the method further includes obtaining encrypted license key and transmitting the encrypted license key along with the video stream over the Wi-Fi network.

According to an aspect of an exemplary embodiment, a method, performed by an apparatus including at least one processor, of conducting wireless fiber inspection includes receiving a video stream and image analysis information over a Wi-Fi network, decrypting the image analysis information, and displaying at least one of the video stream and the decrypted image analysis information.

According to an aspect of an exemplary embodiment, a method, performed by an apparatus including at least one processor, of conducting wireless fiber inspection includes receiving a video stream over a Wi-Fi network, performing image analysis on the received video stream; and displaying at least one of the video stream and image analysis.

According to another exemplary embodiment, the method further includes receiving an encrypted license key over the Wi-Fi network and decrypting the received license key, wherein the performing further comprises performing the image analysis on the video stream using the decrypted license key.

According to an aspect of an exemplary embodiment, an apparatus for conducting wireless fiber inspection includes an inspection probe a processor configured to obtain a video stream from the inspection probe, and a communication interface configured to transmit the video stream over a Wi-Fi network.

According to another exemplary embodiment, the apparatus further includes a Wi-Fi hotspot configured to create the Wi-Fi network.

According to another exemplary embodiment, the processor is further configured to perform image analysis on the obtained video stream, and the communication interface is further configured to transmit the image analysis along with the video stream over the Wi-Fi network.

According to another exemplary embodiment, the processor is further configured to obtain an encrypted license key, and the communication interface is further configured to transmit the encrypted license key along with the video stream over the Wi-Fi network.

According to an aspect of an exemplary embodiment, a non-transitory computer readable recording medium storing a program used in an apparatus, including at least one processor, for conducting wireless fiber inspection, the program causing said at least one processor to obtain a video stream from an inspection probe; and transmit the video stream over a Wi-Fi network.

According to another exemplary embodiment, the program further causes said at least one processor to create the Wi-Fi network using a Wi-Fi hotspot.

According to another exemplary embodiment, the program further causes said at least one processor to perform image analysis on the obtained video stream, and transmit the image analysis along with the video stream over the Wi-Fi network.

According to another exemplary embodiment, the program further causes said at least one processor to obtain encrypted license key, and transmit the encrypted license key along with the video stream over the Wi-Fi network.

BRIEF DESCRIPTION OF THE DRAWING

FIG. 6 is a flowchart describing the process of transmitting a video stream obtained from an inspection probe along with an encrypted license key for image analysis, according to an exemplary embodiment.

FIG. 7 is a flowchart describing the process of receiving a video stream and an encrypted license key, decrypt the license key, and performing image analysis based on the decrypted license key, according to an exemplary embodiment.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
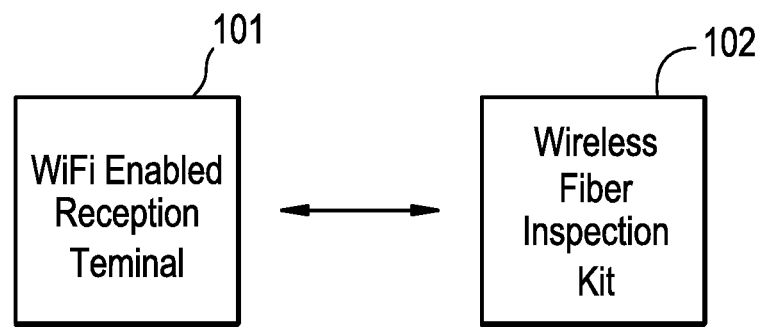
FIG. 1 illustrates a block diagram representing communication between a wireless fiber inspection kit and a Wi-Fi enabled reception terminal, according to an exemplary embodiment.

Referring to the drawings, FIG. 1 illustrates a block diagram representing communication between a wireless fiber inspection kit and a Wi-Fi enabled reception terminal, according to an exemplary embodiment.

Wireless fiber inspection kit 102 may communicate with the Wi-Fi enabled reception terminal 101 over a Wi-Fi network. The Wi-Fi enabled reception terminal 101 may be a Smart Phone, Tablet, or PC, or other similar consumer electronic devices. The features of the fiber inspection kit are described below in further detail with references to FIG. 2. The wireless fiber inspection kit allows multiple users to interface with an instance of the Inspection Probe using their Wi-Fi enabled inspection terminal.

Figure 2:
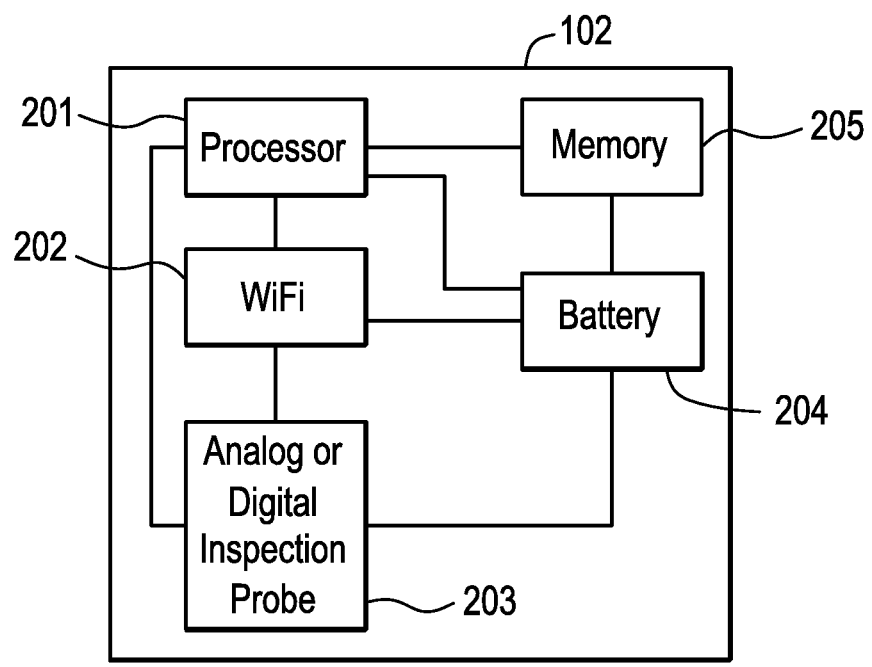
FIG. 2 illustrates a block diagram representing the elements within a wireless fiber inspection kit, according to an exemplary embodiment.

FIG. 2 illustrates a block diagram representing the elements within a wireless fiber inspection kit, according to an exemplary embodiment.

The wireless fiber inspection kit 102 may incorporate a processor to run the operations of the wireless fiber inspection kit 102. The kit may further incorporate an analog or digital inspection probe 203 or may work with an analog or digital inspection probe which is connected to the wireless fiber inspection kit 102. The processor 201 may receive the video stream from the inspection probe, perform image analysis and store both the video stream and the image analysis in the memory 205. The memory According to another embodiment, the processor may only receive the video stream and may pass the video stream along with a license key to the reception device over the Wi-Fi network and the image analysis may be performed on the reception device locally.

The wireless fiber inspection kit 102 may further incorporate a battery 204 which provides power to the inspection probe 203. The inspection kit may further include a Wi-Fi communication hub 202 which also acts as a Wi-Fi hotspot creating a wireless network in its vicinity, a Wi-Fi direct service and/or a Wi-Fi client. According to another embodiment the Wi-Fi communication hub 202 may be split up into two separate modules, one providing only the Wi-Fi service and the other performing the communication of the video stream and other data over the Wi-Fi network. The processor may further perform all the other processing functions of the wireless fiber inspection kit.

An example of a processor is an ARM Xscale 806 Mhz processor. An example of a memory is an 8 Gbit NAND flash memory. The memory may store a program code/operating software which in-turn instructs the processor 201 to perform the various functions describes in FIGS. 4-6 below. The program code/operating software can also be stored on a non-transitory computer readable medium.

The inspection kit may further incorporate features of detecting and selecting the reception device in its vicinity (within its Wi-Fi network) priori to obtaining and transmitting the video stream of the inspection probe.

The inspection kit may further incorporate a user input terminal (not shown in the drawings) in order allow a user to select the reception device to which the video stream and other data should be transmitted. The input terminal may also allow the user to start and stop the Wi-Fi hotspot feature to prevent the feature from being on the entire time. Several other embodiments of implementing the Wi-Fi hotspot and connecting with the reception device are known to one of ordinary skill in the art and may be implemented.

Figure 3:
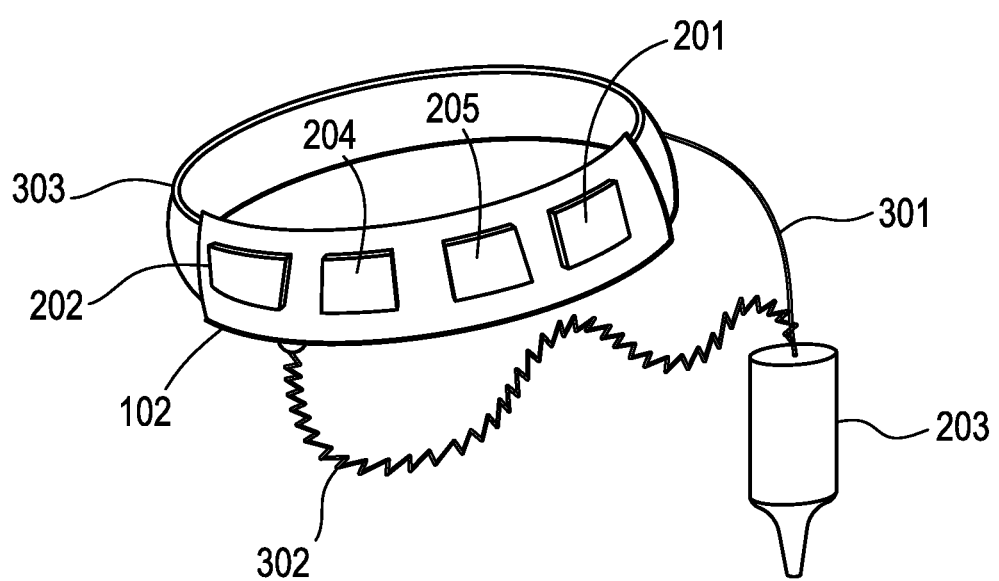
FIG. 3 illustrated a wireless fiber inspection kit assembled on a belt, according to an exemplary embodiment.

FIG. 3 illustrated a wireless fiber inspection kit assembled on a belt, according to an exemplary embodiment.

The kit 102 may be assembled on top of an everyday belt used by a user 303. FIG. 3 further depicts the processor 201, Wi-Fi communication hub 202, battery 204, and memory 205 incorporated within the kit 102 and the inspection probe 203 suspended/connected through a retractable cable 301 as well as a feed cable 302. The retractable cable 301 may be a cable under tension so that the inspection probe 203 may be automatically pulled back to the inspection kit 102 after a user has finished using the probe. The feel cable 302 may not be a cable under tension and may be the hardwire cable carrying power from the batter 204 to the inspection probe 203 and the video stream from the inspection probe 203 back to the inspection kit 102.

The embodiment depicted in FIG. 3 is merely exemplary and the inspection kit may be embodied in numerous different ways well known to one of ordinary skill in the art.

Figure 4:
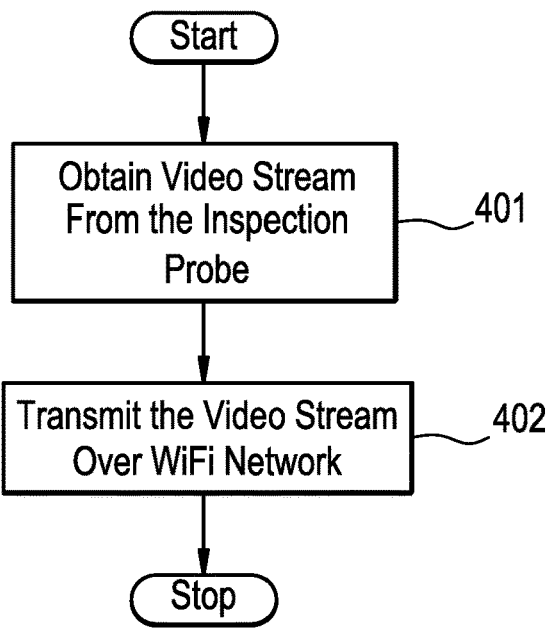
FIG. 4 is a flowchart describing the process of transmitting a video stream obtained from an inspection probe, according to an exemplary embodiment.

FIG. 4 is a flowchart describing the process of transmitting a video stream obtained from an inspection probe, according to an exemplary embodiment.

The process starts with the wireless fiber inspection kit obtaining the video stream from the inspection probe in step 401. The kit then transmits the obtained video stream over the Wi-Fi network to be received by a user reception device in step 402. The processor 201 within the inspection kit 102 may obtain the video stream, store it in the memory and transmit it over the Wi-Fi network using the Wi-Fi communication hub.

Figure 5:
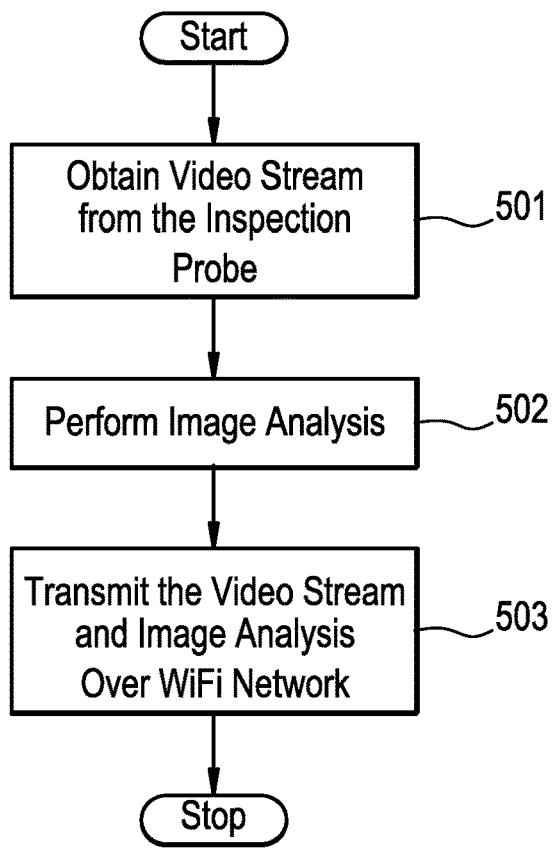
FIG. 5 is a flowchart describing the process of transmitting a video stream obtained from an inspection probe along with image analysis, according to an exemplary embodiment.

At this point the user with the Wi-Fi enabled reception device may receive the video stream The user may be able to receive the video stream without using any application or may use an application to receive the video stream The application may be sold for a price to the user and the access to the video stream may be provided for a fee. Although a method of receiving the video stream and image analysis is provided above, the above discussion is not limited thereto and there are numerous ways to receive and download data over a Wi-Fi network known to one of ordinary skill in the art FIG. 5 is a flowchart describing the process of transmitting a video stream obtained from an inspection probe along with image analysis, according to an exemplary embodiment.

At step 501, the wireless fiber inspection probe 102 obtains the video stream from the inspection probe 203. The inspection kit performs the image analysis using the obtained video stream in step 502. The inspection kit then transmits the video stream along with the image analysis over the same or different Wi-Fi communication channel. The processor 201 within the inspection kit 102 may obtain the video stream, store it in the memory, perform the image analysis and transmit the video stream and the image analysis over the Wi-Fi network using the Wi-Fi communication hub.

At this point the user with the Wi-Fi enabled reception device may receive the video stream and the image analysis. The user may be able to receive the video stream without using any application or may use an application to receive the video stream and/or the image analysis. The application may strip image analysis information from the communication stream and decrypt and then display said image analysis results to the user. The application may be sold for a price to the user and the access to the image analysis may be provided for a fee.

Although a method of receiving the video stream and image analysis is provided above, the above discussion is not limited thereto and there are numerous ways to receive and download data over a Wi-Fi network known to one of ordinary skill in the art.

FIG. 6 is a flowchart describing the process of transmitting a video stream obtained from an inspection probe along with an encrypted license key for image analysis, according to an exemplary embodiment.

At step 601, the wireless fiber inspection probe 102 obtains the video stream from the inspection probe 203. The inspection kit then transmits the video stream along with an encrypted license key, which may have been stored in the memory beforehand, for image analysis, over the Wi-Fi network. The processor 201 within the inspection kit 102 may obtain the video stream, store it in the memory, obtain the encrypted license key from the memory and transmit the video stream and the encrypted license key over the Wi-Fi network using the Wi-Fi communication hub.

At this point the user with the Wi-Fi enabled reception device may receive the video stream and the encrypted license key. The user may be able to receive the video stream without using any application or may use an application to receive the video stream and/or the encrypted license key. The application may strip the license key from the communication stream, decrypt the license key, and then enable the application to locally perform the image analysis and display the results of the image analysis to the user. The application may be sold for a price to the user and the access to the encrypted license key and the performance of image analysis may be provided for a fee.

Although a method of receiving the video stream and image analysis is provided above, the above discussion is not limited thereto and there are numerous ways to receive and download data over a Wi-Fi network known to one of ordinary skill in the art. The process of using the encrypted license key to perform the image analysis at the reception terminal is described in FIG. 7 below.

FIG. 7 is a flowchart describing the process of receiving a video stream and an encrypted license key, decrypt the license key, and performing image analysis based on the decrypted license key, according to an exemplary embodiment.

At step 701, the Wi-Fi enabled reception device 101 received the video stream along with the encrypted license key over the Wi-Fi network. As discussed above, the user may be able to receive the video stream without using any application or may use an application to receive the video stream and/or the encrypted license key. The reception terminal decrypts the license key at step 702. The user reception terminal may be pre-programmed to decrypt the license key or the user may be provided with a decryption code which may be entered into the application on the reception terminal to decrypt the license key. Numerous other ways to decrypt content are well known to one of ordinary skill in the art and the methods described above are not limited thereto.

The user reception terminal then performs the image analysis locally using the decrypted license key within the application at step 703.

The above embodiments describe a wireless fiber inspection kit which provides power to the inspection probe, a means to easily mount the kit to the belt of a user, an automatic retraction method to allow Inspection Probe to easily hang at side of user, support both analog and digital interfaces, a WiFi Hotspot and support ability of any WiFi Compliant External Device to communicate and stream video from the Inspection Probe to said device (for example Smart Phone, Tablet, Laptop, etc.), thereby providing solutions in the field of wireless fiber inspection.

Although use of a software application is described in some embodiments, software applications are not required to interface with the inspection probe as standard WiFi protocol is used.

The embodiments allow users to make use of their existing investments in Smart Phone, Tablet, or PC. They further allows multiple users to interface with an instance of the Inspection Probe while only allowing those who have installed the application supporting the image analysis to see the results of the image analysis. They further provide flexibility in investments made by users allowing them to charge for the application providing image analysis while providing the video stream (without image analysis) for free. The embodiments further provide ergonomic solutions for the users performing the inspection.

Although main benefits of the wireless fiber inspection kit are listed above, the benefits are not limited thereto.

As mentioned above, the embodiments described above are merely exemplary and the general inventive concept should not be limited thereto. While this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

The invention claimed is:

1. A method, performed by an apparatus including at least one processor, of conducting wireless fiber inspection, the method comprising:
   obtaining a video stream of the fiber from a fiber inspection probe;
   storing the video stream in a memory of the apparatus; and
   after storing the video stream, transmitting the video stream from the memory over a Wi-Fi network.

2. The method of claim 1, wherein the transmitting the video stream further comprises creating the Wi-Fi network using a Wi-Fi hotspot and transmitting the video stream over a Wi-Fi network.

3. The method of claim 1, further comprising:
   performing image analysis on the obtained video stream;
   storing the image analysis in the memory; and
   after storing the image analysis, transmitting the image analysis from the memory along with the video stream over the Wi-Fi network.

4. The method of claim 1, further comprising:
   obtaining an encrypted license key; and
   transmitting the encrypted license key along with the video stream over the Wi-Fi network.

5. A method, performed by an apparatus including at least one processor, of conducting wireless fiber inspection, the method comprising:
   receiving a video stream and image analysis information over a Wi-Fi network from a wireless fiber inspection kit comprising a fiber inspection probe and a processor, wherein the video stream and image analysis are stored in a memory of the wireless fiber inspection kit prior to receipt over the network;
   decrypting the image analysis information; and
   displaying at least one of the video stream and the decrypted image analysis information.

6. A method, performed by an apparatus including at least one processor, of conducting wireless fiber inspection, the method comprising:
   receiving a video stream over a Wi-Fi network from a wireless fiber inspection kit comprising a fiber inspection probe and a processor, wherein the video stream is stored in a memory of the wireless fiber inspection kit prior to receipt over the Wi-Fi network;
   performing image analysis on the received video stream; and
   displaying at least one of the video stream and image analysis.

7. The method of claim 6, further comprising:
   receiving an encrypted license key over the Wi-Fi network; and
   decrypting the received license key,
   wherein the performing further comprises performing the image analysis on the video stream using the decrypted license key.

8. An apparatus for conducting wireless fiber inspection, the apparatus comprising:
   A fiber inspection probe;
   a processor configured to obtain a video stream from the fiber inspection probe;
   a memory configured to store the video stream from the fiber inspection probe; and
   a communication interface configured to transmit the video stream from the memory over a network after storing of the video stream in the memory.

9. The apparatus of claim 8, further comprising:
   a Wi-Fi hotspot configured to create the Wi-Fi network.

10. The apparatus of claim 8, wherein
    the processor is further configured to perform image analysis on the obtained video stream and store the image analysis in the memory, and
    the communication interface is further configured to transmit the image analysis along with the video stream from the memory over the Wi-Fi network after storing of the video stream and image analysis in the memory.

11. The apparatus of claim 8, wherein
    the processor is further configured to obtain an encrypted license key, and
    the communication interface is further configured to transmit the encrypted license key along with the video stream over the Wi-Fi network.

12. A non-transitory computer readable recording medium storing a program used in an apparatus, including at least one processor, for conducting wireless fiber inspection, the program causing said at least one processor to:
    obtain a video stream of the fiber from a fiber inspection probe;
    store the video stream in a memory of the apparatus; and
    after storing the video stream, transmit the video stream from the memory over a Wi-Fi network.

13. The non-transitory computer readable recording medium of claim 12, wherein the program further causes said at least one processor to:
    create the Wi-Fi network using a Wi-Fi hotspot.

14. The non-transitory computer readable recording medium of claim 12, wherein the program further causes said at least one processor to:
    perform image analysis on the obtained video stream;
    store the image analysis in the memory; and
    after storing the image analysis, transmit the image analysis from the memory along with the video stream over the Wi-Fi network.

15. The non-transitory computer readable recording medium of claim 12, wherein the program further causes said at least one processor to:
    obtain an encrypted license key; and
    transmit the encrypted license key along with the video stream over the Wi-Fi network.

* * * * *